Aug. 7, 1945.   D. M. STEELE   2,381,086
ASSAYER'S SCALE
Filed April 5, 1943
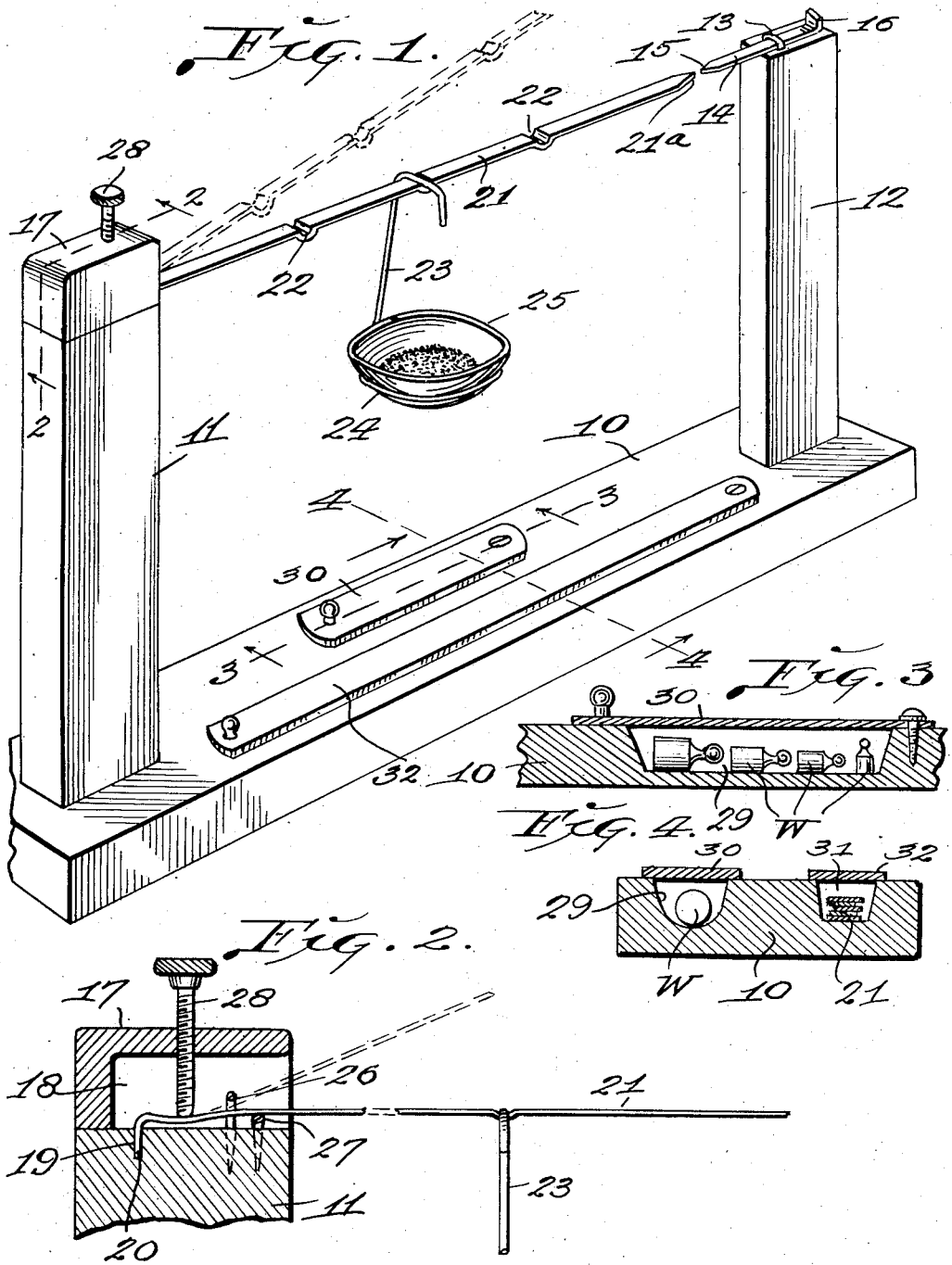
INVENTOR.
DOTY M. STEELE.
BY Martin P. Smith, ATTY.

Patented Aug. 7, 1945

2,381,086

UNITED STATES PATENT OFFICE 2,381,086

ASSAYER'S SCALE

Doty M. Steele, Los Angeles, Calif.

Application April 5, 1943, Serial No. 481,876

2 Claims. (Cl. 265—63)

My invention relates to a weighing scale particularly adapted for the use of assayers, metallurgists and the like, and the principal object of my invention is to provide a simple, compact and accurate scale which may be conveniently employed for weighing precious metals, and the like, and which scale employs a resilient arm adjustably mounted on one end and said arm carries an adjustable hanger including a pan or receptacle for the object or material to be weighed.

A further object of my invention is to provide simple and efficient means for adjusting the angular position of the resilient arm so as to insure accuracy in the weighing operations.

A further object of my invention is to provide a scale base with compartments for the storage of weights of different sizes and for additional resilient scale arms.

With the foregoing and other objects in view, my invention consists in certain novel features of construction and arrangement of parts which will be hereinafter more fully described and claimed and illustrated in the accompanying drawing, in which:

Fig. 1 is a perspective view of a scale constructed in accordance with my invention.

Fig. 2 is an enlarged vertical section taken on the line 2—2 of Fig. 1.

Fig. 3 is a longitudinal section taken on the line 3—3 of Fig. 1.

Fig. 4 is a cross section taken on the line 4—4 of Fig. 1.

Referring by numerals to the accompanying drawing which illustrates a preferred embodiment of my invention, 10 designates a base, preferably an elongated block of wood, or the like, and secured to and projecting upwardly from said base adjacent its ends are posts 11 and 12.

Mounted for adjustment on top of post 12 and retained thereon by suitable means, for instance, a staple 13, is a horizontally disposed finger 14 having a pointed end 15 which projects toward the upper portion of post 11. In order to conveniently manipulate this adjustable pointer, its rear end is upturned to provide a lip or stud 16.

Secured on top of post 11 is a block 17 in which is formed a recess 18 and formed in the top of post 11 near the inner end of recess 18 is a transverse slot 19. Removably seated in this slot is the depending end 20 of an arm 21 composed of thin resilient metal, such as steel, and which is in the form of a narrow strip, preferably having uniform width throughout its length. The free end of this resilient arm is pointed as designated by 21a.

Portions of arm 21 are depressed transversely at spaced intervals to form grooves or notches 22 for the reception of the hooked upper end of a hanger 23.

The lower portion of this hanger is bent to form a horizontally disposed ring 24, thus, providing a support for a shallow saucer-like pan 25 which serves as a container for the material or product which is weighed, and for the weights utilized in the weighing function.

The angularity of the depending end 20 of the resilient arm 21 is such that under normal conditions, the arm occupies an inclined position as illustrated by dotted lines in Figs. 1 and 2, and to limit the upward movement of said arm 21, a staple 26 is seated in the upper portion of post 11 and passes above said arm.

To provide a fulcrum and stop for limiting the downward movement of arm 23, a staple 27 is seated in the upper portion of the post 11, and which staple passes beneath the resilient arm a short distance outwardly within the chamber 18 from the staple 26.

To move and adjust the arm 21 downwardly from its normal inclined position, the lower end of a thumb screw 28 bears on the upper surface of said arm between staple 26 and the downturned end 20 and which screw is seated in the upper portion of block 17.

Formed in the upper portion of base 10 is a recess or pocket 29 for the reception of a plurality of small weights W which are used in the weighing operations, and this pocket is normally closed by a readily removable cover plate 30. Formed in the top of base 10 adjacent the pocket 29 is an elongated recess or pocket 31 which is adapted to serve as a storage chamber for a number of additional arms 21' used in weighing operations, and this pocket is normally closed by a readily removable cover plate 32.

In the use of my improved scale, the pan 25 is suspended from the resilient arm 21 by the hanger 23, and one of the weights W is placed in the pan so as to determine the amount of material or product to be weighed.

Screw 28 is now manipulated so as to flex arm 21 downward until its pointed end 22 is directly opposite the pointed end 15 of finger 14.

The weight W is now removed from pan 25, whereupon arm 21 flexes upwardly, and the material or product to be weighed is now delivered into the pan, and when the pointed end thereof registers with the pointed end 15 of finger 14, a definite weight of such material or product is ascertained. Such weight corresponding to the weight W that was placed in the pan at the beginning of the operation. Obviously, other sized weights may be used in the scale and the pan carrying hanger may be shifted from one notch 22 to another on arm 21, thus giving to the scale a wide range of weighing functions.

The depending ends 20 of the arms are removably seated in the slot 19 in order that a number of arms of different tension may be interchangeably used in the scale.

Thus, it will be seen that I have provided an assayer's scale which is simple in construction, inexpensive of manufacture, and very effective in performing the functions for which it is intended; namely, the accurate weighing of precious metals, and the like.

It will be understood that minor changes in the size, form and construction of the various parts of my improved scale may be made and substituted for those herein shown and described without departing from the spirit of my invention, the scope of which is set forth in the appended claims.

I claim as my invention:

1. In a weighing scale, a pair of spaced uprights, a resilient arm having one end secured to the upper portion of one of said uprights, which arm is normally inclined so that it projects upwardly away from the upright to which it is secured, means for suspending loads from said arm at predetermined points throughout its length and an index finger adjustably mounted on the other upright adjacent the free end of said arm and positioned in the same horizontal plane, with the fixed end of said resilient arm.

2. A weighing scale as set forth in claim 1, including means operatively associated with said arm adjacent its point of attachment to the first mentioned upright for adjusting the angular position of said resilient arm.

DOTY M. STEELE.